(12) United States Patent
Bowman

(10) Patent No.: US 6,488,316 B1
(45) Date of Patent: Dec. 3, 2002

(54) FLEXIBLE METAL HOSE TERMINATION FITTING WITH ADAPTER FOR TERMINATION PLATE

(75) Inventor: Brian K. Bowman, Waynetown, IN (US)

(73) Assignee: Tru-Flex Metal Hose Corp., Lebanon, IN (US)

( * ) Notice: Subject to any disclaimer, the term of this patent is extended or adjusted under 35 U.S.C. 154(b) by 0 days.

(21) Appl. No.: 09/876,930

(22) Filed: Jun. 8, 2001

(51) Int. Cl.[7] .............................................. F16L 11/118
(52) U.S. Cl. ..................... 285/149.1; 285/192; 285/319; 285/335; 285/348; 285/351; 285/903
(58) Field of Search .............................. 285/149.1, 903, 285/FOR 139, 351, 335, 319, 348, 192

(56) References Cited

U.S. PATENT DOCUMENTS

| | | | |
|---|---|---|---|
| 2,478,149 A | * | 8/1949 | Wolfram et al. ............ 285/342 |
| 2,503,169 A | | 4/1950 | Phillips |
| 2,521,127 A | * | 9/1950 | Price .......................... 285/231 |
| 2,628,111 A | * | 2/1953 | Smalline ..................... 285/310 |
| 2,666,657 A | | 1/1954 | Howard et al. |
| 3,008,738 A | | 11/1961 | Longfellow |
| 3,552,781 A | * | 1/1971 | Helland ....................... 285/322 |
| 3,600,009 A | | 8/1971 | Shupper |
| 3,749,424 A | * | 7/1973 | Greene .................... 285/139.1 |
| 3,858,421 A | | 1/1975 | Wood |
| 4,068,863 A | | 1/1978 | Lasko |
| 4,084,309 A | | 4/1978 | Wood |
| 4,423,891 A | | 1/1984 | Menges |
| 4,437,691 A | | 3/1984 | Laney |
| 4,440,425 A | * | 4/1984 | Pate et al. ................... 285/161 |
| 4,629,226 A | | 12/1986 | Cassel et al. |
| 4,630,850 A | | 12/1986 | Saka |
| 4,674,775 A | | 6/1987 | Tajima et al. |
| 4,811,976 A | | 3/1989 | Yagisawa |
| 4,940,263 A | | 7/1990 | Mayernik |
| 5,068,494 A | * | 11/1991 | Bolante ................... 174/65 SS |
| 5,080,405 A | | 1/1992 | Sasa et al. |

(List continued on next page.)

FOREIGN PATENT DOCUMENTS

| | | |
|---|---|---|
| EP | 545410 | 6/1993 |
| FR | 525552 | 9/1921 |
| FR | 2653202 | 4/1991 |
| GB | 2241547 | 4/1991 |
| JP | 58-109790 | 6/1983 |
| JP | 1203791 | 8/1989 |
| JP | 6011084 | 6/1992 |

OTHER PUBLICATIONS

Titeflex CSST Design and Installation Guide (Apr. 1994), Springfield, MA 01139–0054, pp. 2, 3, 8 and 21.
PRO–FLEX CSST Installation / Training Guide (1994, reprint #4 11/99), Tru–Flex Metal Hose Corp., West Lebanon, IN 47991 (entire brochure).
Berghofer Kassel Brochure (1993), Kassel, Germany, pp. 1–4.
Chicago Metal Hose Corporation, Rex–Weld and Red–Tube Flexible Metal Hose Brochure, Maywood, IL (Chicago suburb), p. 15.
Dong–A Flexible Metal Tubes Co., Ltd. Brochure, Seccho–dong, Seocho–Ku, Seoul, Korea, pp. 1 and 15.
Design and Installation Guide for WardFlex, Ward Manufacturing, pp. 38–39, 42–43.

Primary Examiner—Robert J. Sandy
Assistant Examiner—Carlos Lugo
(74) Attorney, Agent, or Firm—Shook, Hardy & Bacon L.L

(57) ABSTRACT

A sealed coupling system for flexible hose, such as corrugated hose, includes a termination fitting that mounts the sealed system to a static structure, such as a wall or the like. The system uses threaded connections to fix the hose to the fitting and to the structure and thus does not require welding, brazing or the like and has the main components thereof located on one side of the structure.

6 Claims, 3 Drawing Sheets

U.S. PATENT DOCUMENTS

| | | |
|---|---|---|
| 5,128,112 A | 7/1992 | Van der Sluys et al. |
| 5,178,422 A | 1/1993 | Sekerchak |
| 5,199,747 A | 4/1993 | Jahr |
| 5,201,554 A | 4/1993 | Gagg et al. |
| 5,222,288 A | 6/1993 | Thomas |
| 5,228,479 A | 7/1993 | Thomas |
| 5,283,393 A | 2/1994 | Guginsky |
| 5,292,156 A * | 3/1994 | Sasa et al. .................... 285/23 |
| 5,362,113 A | 11/1994 | Thomas |
| 5,383,492 A | 1/1995 | Segal |
| 5,441,312 A | 8/1995 | Fujiyoski et al. |
| 5,492,374 A * | 2/1996 | Sauer et al. ................. 285/305 |
| 5,494,319 A | 2/1996 | Thomas |
| 5,538,294 A | 7/1996 | Thomas |
| 5,799,989 A | 9/1998 | Albino |
| 5,845,946 A * | 12/1998 | Thomas ...................... 285/348 |
| 5,915,736 A * | 6/1999 | Marik et al. ............... 285/21.3 |

\* cited by examiner

FLEXIBLE METAL HOSE TERMINATION FITTING WITH ADAPTER FOR TERMINATION PLATE

BACKGROUND OF THE INVENTION

Hoses, conduits, pipes, and like fluid conveying systems are commonly used to convey a wide variety of different fluids from a source to a location of use. Many such fluid conveying systems have at least a portion thereof which is flexible to accommodate misalignment and/or relative movement between system components being connected. For example, fuel lines intended to convey gas fuels such as natural gas or the like, from a source to a use location are sometimes constructed to include at least one portion formed of flexible hose.

If the flexible portion is corrugated metal, it will have several advantages over other forms list of hose used to convey fluids, including an ability to move, expand and contract while remaining a secure fluid-tight structure. Moreover, as compared to several other forms of hose or conduit, corrugated hose is inexpensive to manufacture yet is structurally secure enough to be safely used in most gas flow situations. Therefore, installation of gas-fired appliances can be expedited because exact placement is not necessary and mis-placement caused by approximate positioning can be accommodated and corrected by a flexible gas line that is sufficiently secure for the purpose. Thus, gas lines can be permanently installed in a building and routed through the structure from a gas source to the general location of gas-fired equipment and appliances. Less permanent gas lines can then be used to make the final connections to the appliances themselves, and are commonly referred to as "whips," and are used to accommodate and correct mis-location caused by approximate positioning of an appliance. Gas line whips are commonly fabricated from lengths of corrugated, flexible metal hose. Whip gas lines are also commonly used with appliances which are subject to some degree of movement, such as gas-fired dryers, ovens and the like.

Even though gas line whips are flexible, they, like permanent gas lines require secure end connections. Design criteria common to such gas lines include providing secure, fluid-tight seals and providing sufficiently strong end connections to avoid a separation or pull-out of the line from the appliance or other equipment. In the case of a gas fuel line, leaks can be very dangerous since many gas fuels are by nature both toxic and highly flammable. Thus, to avoid accidental gas poisoning or explosion, structural security with such systems is very important.

Threaded fittings have been found to provide a coupling that is secure and leak-resistant enough for gas flow systems of the type used in most settings. In the case of rigid gas lines, sufficient material thickness is generally present to provide threaded fittings which are secure enough for the purposes associated with such settings. With corrugated flexible metal hose, however, the material is often relatively thin walled and thus not sufficiently thick to accommodate threading which is of a size sufficient to form a connection that is secure enough for the purposes of gas line connections in most systems.

Therefore, there is a need for a coupling system for a corrugated flexible hose with the advantages and features required for a secure connection of a corrugated hose to another element that is secure enough for connecting a gas line to that element.

To address the problem of providing secure fittings on a flexible metal hose, various coupling systems have been devised. These include a variety of compression fittings, washers, O-rings, and gaskets. Still further patents, such as U.S. Pat. No. 6,102,445, the disclosure of which is incorporated herein by reference, disclose a system for coupling a corrugated hose to another element. In particular, this incorporated patent discloses a coupling system for coupling a flexible metal hose with an annular or spiral corrugations to devices, such as a gas-fired appliance or a fuel source. The hose coupling system of the incorporated patent includes a fitting assembly with inner and outer fittings adapted for threaded interconnection on the end of the flexible hose. The inner fitting includes a bore which receives a washer assembly with an O-ring for forming a sealed connection, a backer ring and an expandable washer. The expandable washer is selectively received on the corrugations of the flexible hose and functions to retain the fitting and washer assemblies securely in place and to prevent pull-out of the coupling while providing a positive connection to the hose whereby the O-ring gasket can be compressed for an effective seal.

One form of the coupling system disclosed in FIGS. 9–11 of the incorporated patent couples the flexible hose to a wall or other such static structure. While effective, this form of the invention disclosed in the incorporated patent can be improved in several areas.

For example, the coupling system disclosed in the incorporated patent may require brazing and/or welding to complete the connection. While such steps effect a secure seal, they are often time-consuming and labor intensive. The extra steps and time associated with such steps may be expensive.

Therefore, there is a need for a sealed coupling system for corrugated flexible hose that can effect a secure seal between the hose and another element, such as a static structure, without requiring a step of brazing and/or welding.

Still further, the flexible hose often extends through an opening in a wall or other such static structure with the sealed coupling being located on one side of the wall and the hose being fed through the wall from the other side of the wall. This can create difficulties due to the hidden nature of some of the connections with respect to the other connections. Still further, if there is a problem with the part of the connection system that is located inside a wall after the system is in place, a great deal of labor and effort may be required to fix the problem.

Therefore, there is a need for a sealed coupling system for corrugated flexible hose that can effect a secure seal between the hose and another element, such as a static structure, without requiring hidden coupling elements.

Since some gas flow systems extend through a wall of a building, it is usually necessary to ensure that any opening in that wall is securely closed once the system is in place. This will prevent moisture and/or insects from invading the building through the opening. However, it is also necessary that such protection not be unduly expensive or difficult to install.

Therefore, there is a need for a sealed coupling system for corrugated flexible hose that can effect a secure seal between the hose and another element, such as a static structure while protecting the integrity of the finished coupling system and the static structure.

SUMMARY OF THE INVENTION

These and other objects are achieved by a sealed coupling system for corrugated flexible hose that includes a one-piece male/female termination fitting that mounts on a base plate to sealingly couple a flexible corrugated hose to a static structure, such as a wall or the like.

The sealed coupling system includes a gasket, a retainer ring and a slider ring to securely couple the flexible hose to the termination fitting in the manner described in the incorporated patent.

A stop element is also included to further secure the system in place in a manner that ensures the integrity of any static structure through which the corrugated hose extends. The stop plate also ensures the secure nature of the fitting system and is expeditiously mounted in place.

The sealed system of the present invention eliminates the need for welding and/or brazing because connections are effected using threadable connections. Still further, hidden fittings are eliminated because the transition fitting of the present invention can be securely mounted on a wall and has elements that can be securely connected to the hose and to other elements mounting the hose on the wall which can be located on one side of the wall while the hose extends through the wall from the other side.

TECHNICAL FIELD OF THE INVENTION

The present invention relates to the general field of pipe couplings and joints, and to the particular area of corrugated hoses and couplings therefor.

OBJECTS AND ADVANTAGES OF THE INVENTION

It is a main object of the present invention to improve the coupling system disclosed in the incorporated document, U.S. Pat. No. 6,102,445.

It is another object of the present invention to provide a coupling system for corrugated flexible hose which can securely connect that hose to a static structure without the need of brazing and/or welding.

It is another object of the present invention to provide a coupling system for corrugated flexible hose which can securely connect that hose to a static structure without the need of hidden fittings.

It is another object of the present invention to provide a sealed coupling system for corrugated flexible hose that can effect a secure seal between the hose and another element, such as a static structure while protecting the integrity of the finished coupling system and the static structure.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 4:
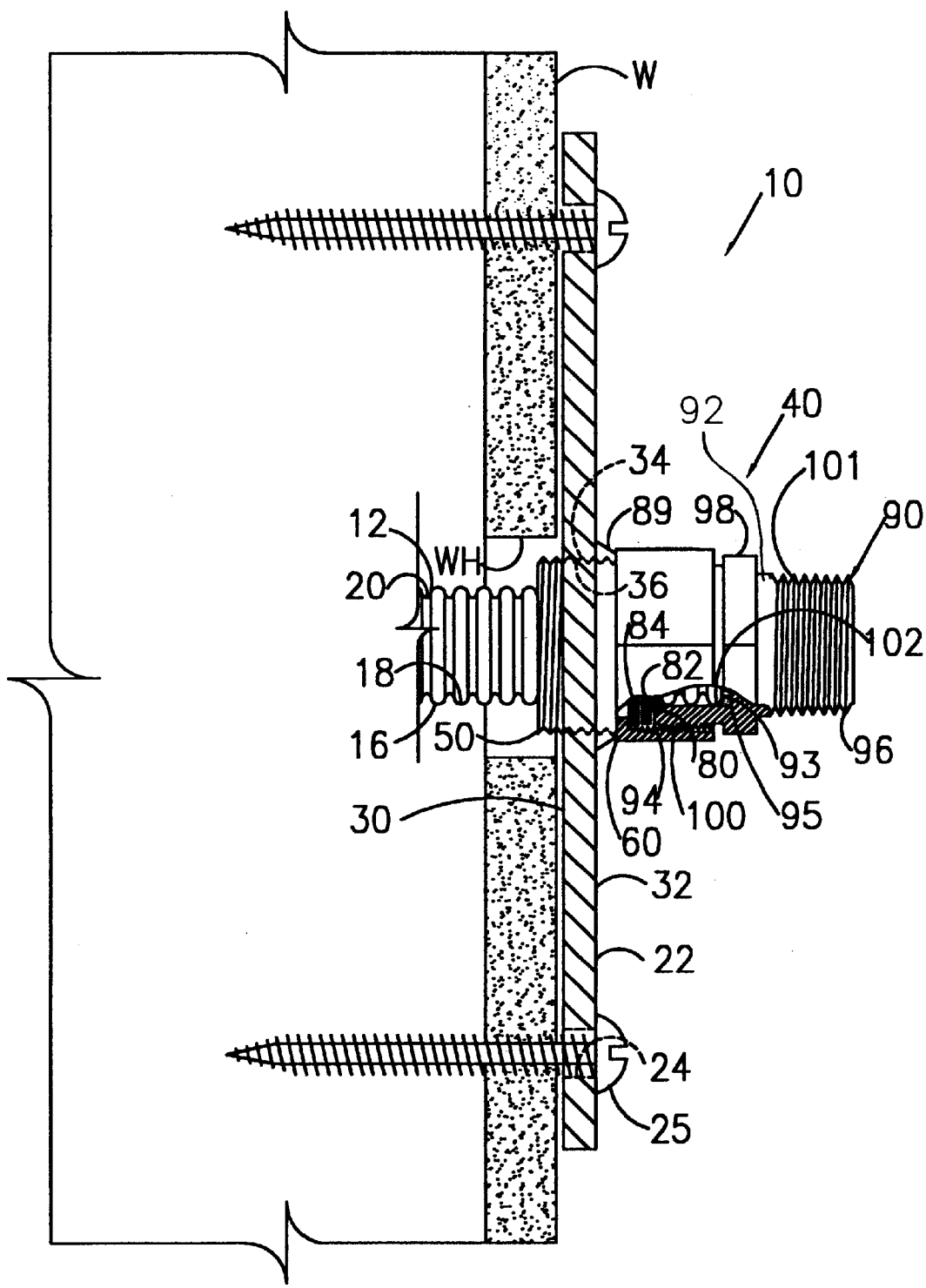
FIG. 4 is a side elevational view of a base plate having a termination fitting mounted thereon, with the other side being similar to the side shown in FIG. 4.

Referring first to FIG. 4, a sealed coupling system 10 for coupling a flexible hose, such if as corrugated hose 12 to another element (not shown) is illustrated. In the preferred form of the invention, hose 12 extends through a wall or other such static structure, indicated in FIG. 4 as wall W. As discussed in the incorporated patent, hose 12 includes corrugations 16 having lands 18 and grooves 20. Hose 12 can be located inside wall W or inside a structure formed by walls and extends through the wall.

In order to securely mount hose 12 to the static structure so all of the connecting and mounting elements are easily accessible for installation and/or service, system 10 includes a base plate 22 that is mounted on the wall as by anchor screws 25 or the like extending through fastener-receiving holes 24 and into wall W as described in the incorporated patent, and has all of the elements effecting the connection located on one side of the base plate. In order to effect the connection without requiring welding or brazing or the like yet will remain secure, system 10 uses threaded connections between all fitting elements. Accordingly, a secure connection between hose 12 and other elements can be effected in a safe and expeditious manner yet the threaded connection can be easily and safely used with corrugated hose which may be thin walled.

Figure 3:
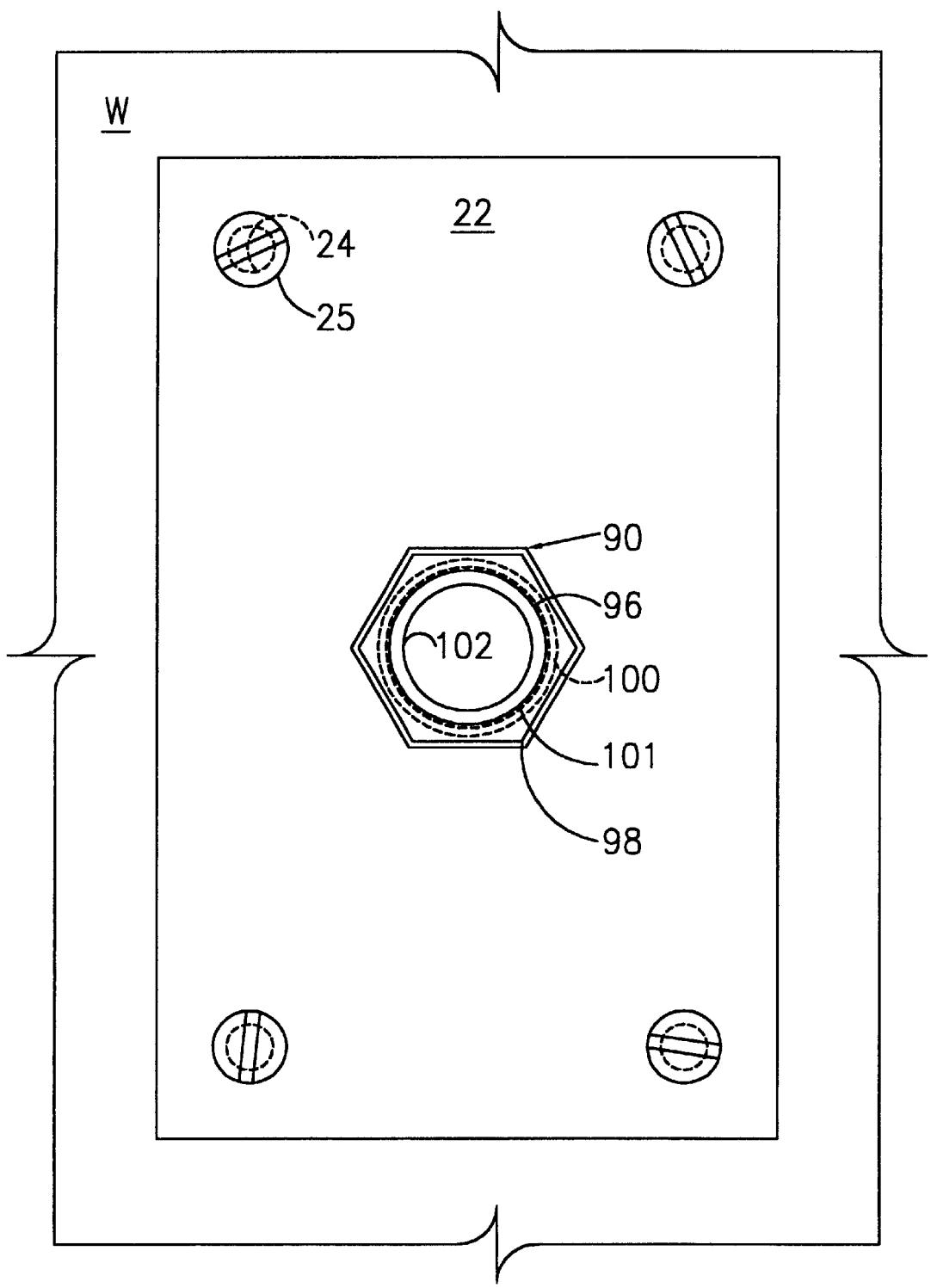
FIG. 3 shows a front elevational view of a base plate with a termination fitting mounted thereon, the rear view of the base plate is similar to the front view thereof

Referring to FIGS. 3 and 4, it is seen that base plate 22 includes an inner face 30 which abuts one surface of wall W, such as the outer surface thereof, and an outer face 32 that is located on the outside of the wall when base plate 22 is mounted thereon. Base plate can be formed of any suitable material and has a base plate opening 34 defined therethrough from inner face 30 to outer face 32. Screw threads 36 are defined on the base plate adjacent to opening 34. Base plate 22 is easily and securely mounted on wall W adjacent to an opening WH through the wall with opening 34 aligned with opening WH through the wall. Hose 12 extends though the aligned openings from one side of the wall to the outer side of the base plate.

Figure 2:
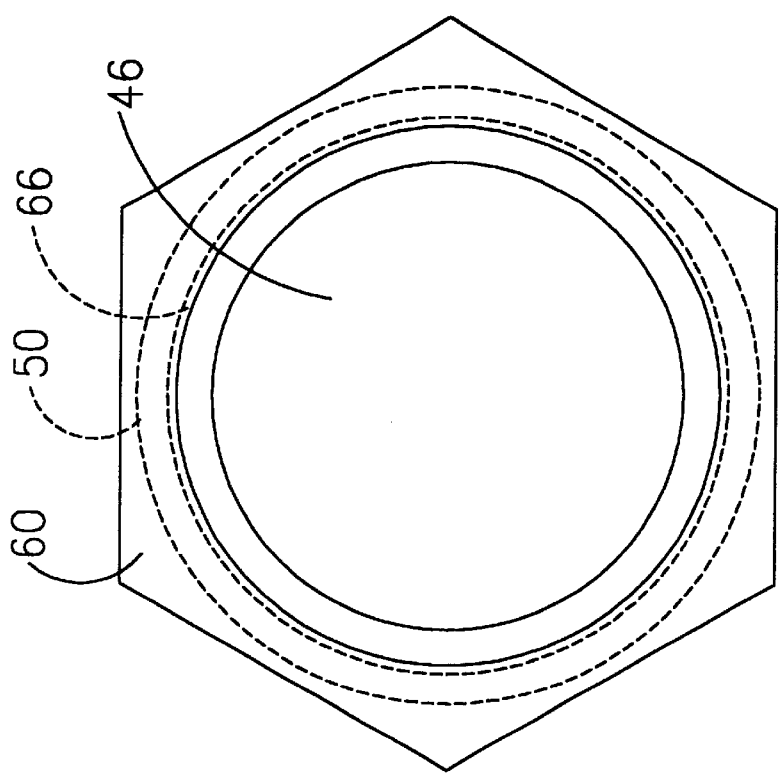
FIG. 2 shows an end elevational view of the termination fitting.
Figure 1:
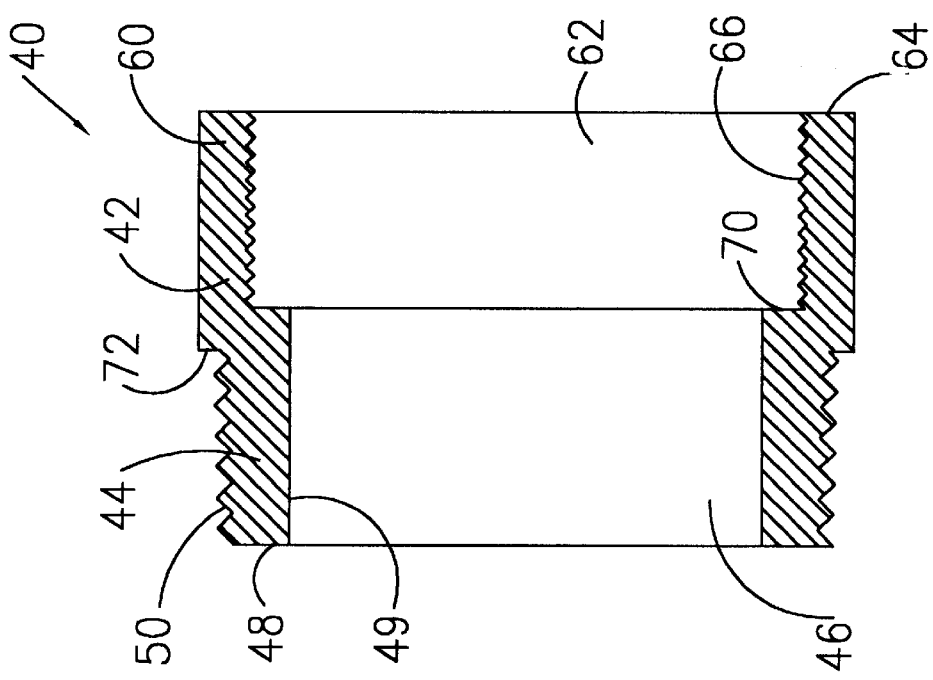
FIG. 1 shows a cut away side elevational view of a termination fitting used in the coupling system embodying the present invention.

Referring to FIGS. 1 and 4, it is seen that system 10 includes a termination fitting 40 that received in the aligned openings WH and 34 through the wall and through the base plate respectively. Termination fitting 40 is a one-piece element that includes a body 42, a male section 44 on body 42 having a bore 46 defined therethrough from first end 48 that will be located inside wall W when the termination fitting is mounted on the wall and an inner surface 49 adjacent to bore 46. External threads 50 are defined on male section 44 and are sized and configured to threadably engage internal threads 36 on base plate 22 when termination fitting 40 is mounted on base plate 22. Termination fitting body 42 further includes a female section 60 having a bore 62 defined therethrough from second end 64 and which is aligned with bore 46 defined through male section 44 and has internal threads 66 defined thereon to be adjacent to bore 62 defined through female section 60. As can be seen in FIG. 1, bore 62 has an internal diameter that is greater than the internal diameter of bore 46 so body 42 includes an internal shoulder 70 located at the intersection of bore 46 through male section 44 and bore 62 through female section 60. Termination fitting 40 further includes an external shoulder 72 on body 42 of the termination fitting. External shoulder 72 is located near internal shoulder 70 of body 42 of the termination fitting and serves a purpose that will be understood from the disclosure presented below.

Termination fitting 40 is mounted on wall W by threadably engaging external threads 50 with internal threads 34 of base plate 22 after that base plate has been mounted on the wall. This is illustrated in FIG. 4, with male section 50 extending through base plate 22 and through wall W, and female section 60 extending outwardly from the base plate and from the wall.

As discussed in the incorporated patent, the coupling system includes elements to fix hose 12 to the system. Reference is made to the incorporated patent for a full discussion of such elements, with the elements only being mentioned here. Thus, system 10 includes a gasket 80 sized to encircle hose 12 and seat thereon when the hose is received through aligned bores 46 and 62 and through opening WH through wall W. System 10 further includes a slider ring 82 sized to encircle hose 12 received through the aligned bores 46 and 62 and to abut gasket 80 when slider ring 82 is in place on hose 12 in termination fitting 40. A retainer ring 84 is sized to encircle hose 12 received through aligned bores 46 and 62 defined through male section 44 and female section 60. Retainer ring 84 abuts internal shoulder 70 and slider ring 82 when the retainer ring 84 is in place on hose 12 in termination fitting 40.

Still referring to FIG. 4, it is seen that system 10 further includes a stop element 89 sized and configured to encircle male section 44 of termination fitting 40 and to abut the wall and external shoulder 72 on termination fitting 40 and to be interposed between external shoulder 72 and outer face 32 of base plate 22 when termination fitting 40 is mounted on base plate 22.

Still referring to FIG. 4, it is seen that system 10 further includes a double-ended fitting 90 having a purpose and function similar to the internal fitting described in the incorporated patent. Since fitting 90 is similar in operation, function and purpose to the internal fitting described in the incorporated patent, fitting 90 will be only broadly described with reference being made to the incorporated patent for a full description thereof Thus, as shown in FIG. 4, fitting 90 includes a body 92 having a first end 94 that is located inside female section 60 of termination fitting 40 when system 10 is assembled with fitting 90 received in termination fitting 40. Fitting 90 further includes a second end 96 that is located outside of termination fitting 40 when fitting 90 is received in fitting 40, and a nut 98 located between first end 94 and second end 96 of double-ended fitting 90. Double-ended fitting 90 further includes external threads 100 on first end 94. External threads 100 are sized and configured to threadably engage internal threads 66 on female section 60 of termination fitting 40 when double-ended fitting 90 is mounted on termination fitting 40. External threads 101 are located on second end 96 of double-ended fitting 90. External threads 101 can be used to connect other elements, such as conduits or fittings or the like, to system 10. The other elements can effect fluid connection between a source of gas and a gas-using device such as a dryer or the like.

Double-ended fitting 90 further includes a bore 102 defined through the body of double-ended fitting 90 to be aligned with aligned bores 46 and 62 of male section 44 and female section 60 of termination fitting 40 when double-ended fitting 90 is mounted on termination fitting 40.

As shown in FIG. 4, a terminal end on first end 94 of double-ended fitting 90 abuts gasket 80 when double-ended fitting 90 is mounted on termination fitting 40 with hose 12 received in termination fitting 40. This abutting contact, along with the operation of retainer ring 84 and slider ring 82 securely couples hose 12 to termination fitting 40 in a manner such as described in the incorporated patent with respect to the coupling described therein.

Operation of system 10 is similar to the operation of the system disclosed in the incorporated patent. Accordingly, operation of system 10 will be only briefly discussed.

A bore is defined through wall W to define an opening WH base plate 22 is mounted on the wall to have bore 34 aligned with opening WI, and hose 12 is inserted through the aligned openings. Stop element 89 is located on section 44 of termination fitting 40. Termination fitting 40 is threadably mounted to base plate 22 via threading engagement of threads 44 and 36 with hose 12 extending through aligned bores 46 and 62 of termination fitting 40. Termination fitting 40 is screwed into place until stop element 89 is firmly held in place between external shoulder 72 and outer surface 32 of the base plate. The stop element ensures that termination fitting 40 will be securely held in place without overtightening the element in threads 34. The stop element further ensures that the opening through the wall will be covered to prevent entrance of moisture, insects or the like through the opening in the wall. The remainder of system 10 is closed so no entrance path through wall W is established via system 10.

Retainer ring 84 is placed on hose 12 as discussed in the incorporated patent, then slider ring 82 is placed on the hose and gasket 80 is placed on the hose. The hose is then drawn back into termination fitting 40 until retainer ring 84 abuts against internal shoulder 70 of termination fitting 40. Double-ended fitting 90 is then threadably engaged with termination fitting 40 by threadably engaging the external threads 100 on end 94 of double-ended fitting 90 with the internal threads 66 of the termination fitting. Double-ended fitting 90 is threadably engaged with termination fitting 40 until the gasket, the retainer ring and the slider are properly seated as described in the incorporated patent. The threaded engagement between fittings 40 and 90 is effected using nut 98. An outer end 93 of the hose 12 engages a compression gasket 95 within the double-ended fitting 90. The hose 12 is thus double-sealed. An inner seal is formed between the gasket 80, the corrugated hose 12 and the double-ended fitting 90. A second seal is formed between the hose outer end 93 and the compression gasket 95, which are pressed together threadably advancing the double-ended fitting 90 into the termination fitting body 42.

Once the fittings 40 and 90 are fully engaged, and base plate 22 is fully engaged along with stop element 89, hose 12 is fully and securely mounted on wall W with all of the mounting fittings located on one side of the wall and all connections being effected using threading engagements. Using system 10, a gas source can be expeditiously yet securely connected to a gasdriven device. For example, permanent conduit such as might be located outside a building to connect that building to a utility source can be connected via system 10 to flexible hose 12 located inside the building which then effects the final connection to the gas-driven device in the building even if that gas-driven device is not located near opening WH through wall W. The permanent conduit can even be located inside wall W in some situations. Of course, those skilled in the art will be able to understand various other ways system 10 can connect hose 12 to another element and other situations that include hose 12 located on one side of a wall and another element located on the other side of the wall based on the teaching of the present disclosure. Such variations are also intended to be included in this disclosure as well.

It is to be understood that while certain forms of the present invention have been illustrated and described herein, it is not to be limited to the specific forms or arrangement of parts described and shown.

What is claimed and desired to be secured by letters patent is as follows:

1. A sealed coupling system for corrugated flexible hose comprising:
   A) a base plate including
      (1) inner and outer faces,
      (2) a base plate opening defined through said inner and outer faces, and
      (3) internal threads on said base plate adjacent to said opening;
   B) a termination fitting including
      (1) a body,
      (2) a male section on said body having a bore defined therethrough and external threads thereon which are sized and configured to threadably engage the internal threads on said base plate when said termination fitting is mounted ons aid base plate,
      (3) a female section on said body having a bore defined therethrough which is aligned with the bore defined through said mail section and internal threads defined thereon to be adjacent to the bore defined through said female section;
      (4) an internal shoulder located at the intersection of the bore through said male section and the bore through said female section;
   C) a gasket sized to encircle a flexible hose received through the aligned bores defined through said male section and through said female section with the flexible hose extending out of said termination fitting through said male section of said body of the termination fitting;
   D) a slider ring sized to encircle the flexible hose received through the aligned bores defined through said male section and through said female section, said slider ring abutting said gasket when said slider ring is in place on the hose in said termination fitting; and
   E) a retainer ring sized to encircle a flexible hose received through the aligned bores defined through said male section and through said female section, said retainer ring abutting the internal shoulder of said body and said slider ring when said retainer ring is in place on the hose in said termination fitting.

2. The sealed coupling system defined in claim 1 further including an external shoulder on said termination fitting, said external shoulder being located near the internal shoulder of said termination fitting.

3. The sealed coupling system defined in claim 2 further including a stop element sized and configured to encircle the male section of said termination fitting and to abut the external shoulder on said termination fitting and to be interposed between the external shoulder and the outer face of said base plate when said termination fitting is mounted on said base plate.

4. The sealed coupling system defined in claim 3 wherein said termination fitting is one-piece construction.

5. The sealed coupling system defined in claim 3 further including a double-ended fitting having
   (1) a body,
   (2) a first end, a second end and a nut located between the first and second ends of said double-ended fitting,
   (3) male threads on said first end, the male threads on the first end of said fitting being sized and configured to threadably engage the internal threads on the female section of said termination fitting when said double-ended fitting is mounted on said termination fitting,
   (4) a bore defined through the body of said double-ended fitting to be aligned with the aligned bores of the male section of said termination fitting and the female section of said termination fitting when said double-ended fitting is mounted on said termination fitting, and
   (5) a terminal end on the first end of said double-ended fitting that abuts said gasket when said double-ended fitting is mounted on said termination fitting with the flexible hose received in said termination fitting and extending out of said termination fitting through said male section of said body of the termination fitting.

6. The sealed coupling system defined in claim 5 further including external threads on the second end of said double-ended fitting.

* * * * *